United States Patent [19]

Mortensen

[11] Patent Number: 4,634,004
[45] Date of Patent: Jan. 6, 1987

[54] MAGNETIC TAPE SECURITY HOUSING
[75] Inventor: Roger L. Mortensen, Chanhassen, Minn.
[73] Assignee: Empak Inc., Chanhassen, Minn.
[21] Appl. No.: 680,518
[22] Filed: Dec. 11, 1984
[51] Int. Cl.[4] .................... B65D 17/00; B65D 85/672
[52] U.S. Cl. .................................. 206/387; 206/1.5; 206/807
[58] Field of Search ................... 206/1.5, 45.14, 45.31, 206/387, 807

[56] References Cited

U.S. PATENT DOCUMENTS

| | | | |
|---|---|---|---|
| 3,115,229 | 12/1963 | Erhard | 190/117 |
| 3,265,168 | 8/1966 | Erhard | 190/117 |
| 3,508,643 | 4/1970 | Horn | 220/4 E |
| 3,871,516 | 3/1975 | Holkestad et al. | 206/45.31 |
| 3,944,033 | 3/1976 | Simson | 190/117 |
| 4,245,741 | 1/1981 | Holkestad | 206/387 |
| 4,336,883 | 6/1982 | Krug et al. | 190/117 |
| 4,366,915 | 1/1983 | Seidler | 206/1.5 |
| 4,381,836 | 5/1983 | Rivkin et al. | 206/807 |
| 4,466,540 | 8/1984 | Lotrous et al. | 206/1.5 |
| 4,493,433 | 1/1985 | Sideri et al. | 206/1.5 |

Primary Examiner—William Price
Assistant Examiner—Jimmy G. Foster
Attorney, Agent, or Firm—Hugh D. Jaeger

[57] ABSTRACT

Magnetic tape security housing including two mirror imaged halves which mate together with opposing hooks and latches forming a magnetic tape security package, with combination U-shaped carrying handle and package hanging ports, for encompassing a cardboard box containing a magnetic tape, such as a video game tape, cassette tape, a VHS or Beta video tape, floppy disks, or other like valuables. The mated housings engage integrally together to form a package to protect a box containing a magnetic tape or the like. The only way that the box can be removed from the package is through destruction of the housing members. The package is non-openable except through total destruction of one or both of the housing members.

1 Claim, 6 Drawing Figures

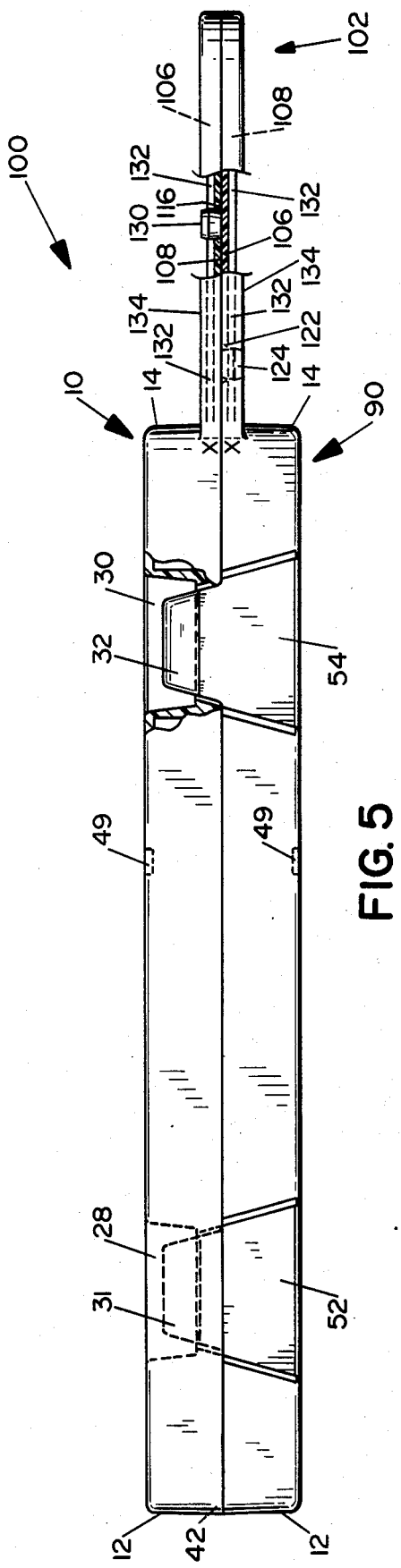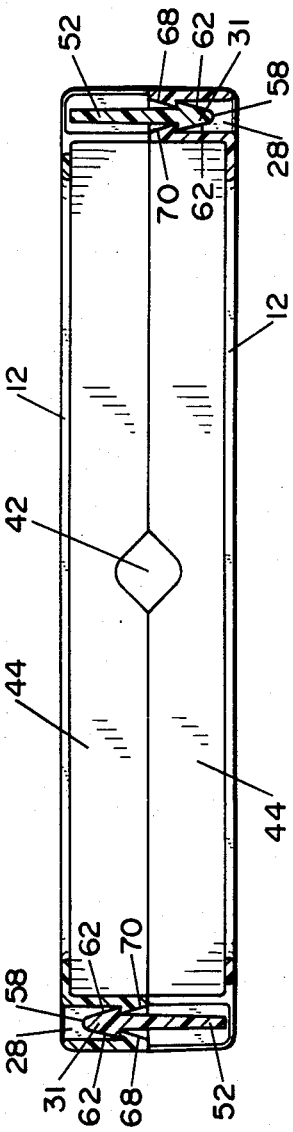
FIG. 5
FIG. 6

MAGNETIC TAPE SECURITY HOUSING

BACKGROUND OF THE INVENTION

1. Field of the Invention

The present invention pertains to a package, and more particularly, a package for securing of magnetic tapes, such as cassette tapes, video tapes, computer game tapes, or the like, stored in a cardboard box. The package includes two magnetic tape security housings which are of mirror images and locked together by opposing hooks and latches of the housings, as well as snap fasteners engaged into ramped holes of a handle attached to the housings.

2. Description of the Prior Art

With the recent advent of computer games, manufacturers and retailers have attempted to prevent the theft of magnetic tape cartridges by packaging the tape cartridges in a box considerably larger than the tape cartridge itself. Unfortunately, the attempts have been foiled in that shoplifters and thieves will open the cardboard boxes and slip the magnetic tape cartridge into their pocket, such as their shirt pocket, coat pocket, or purse. This has been a less than desirable situation. Further attempts in making the cardboard boxes larger and placing the magnetic tape cartridges on magnetic inserts have gone to no avail.

The present invention overcomes the disadvantages of the prior art by providing a large magnetic tape security package with carrying handle for totally encompassing a cardboard box, particularly the ends, and which is not openable except by destroying the housings which form the package to obtain access to the inside of the cardboard box.

SUMMARY OF THE INVENTION

The general purpose of the present invention is to provide a magnetic tape security package of two magnetic tape security housings which are mirror images of each other for encompassing a cardboard box which may contain a magnetic tape, such as a audio cassette tape, a video cassette tape, a computer cassette tape, or like magnetic data storage medium such as floppy disks, for preventing access to the box. The package formed by the two housings, which mate and lock together, totally encompass the ends, as well as the edges of the box, leaving only exposed partial front and back surfaces. The package includes a carrying handle which features a hanging notch for display on a single display rod of a rack and hanging surfaces to accommodate dual display rod bars as commonly found on most display stands. The package can be utilized to encompass any boxed type of merchandise and is not limited to only magnetic tapes.

According to one embodiment of the present invention, there is provided a magnetic tape security package including mirror image opposing housing members, each housing including left and right opposing channel members; upper and lower opposing left and right U-shaped channels; upper and lower mid-portion U-shaped channels; and a security bar between the channels; latches positioned on both sides of the upper mid-portion channels; hooks positioned on both sides of the lower mid-portion U-shaped channels; and upper and lower inner extending edges between the left and right channel members and extending inwardly from the U-shaped channels; an open area internally about each of said hooks along the lower inwardly extending edge and, a U-shaped carrying handle, including a U-shaped hanging-carrying bar and connecting bar supports, a single and dual functioning hanging area in the bar, reinforced inner and outer edge members along the bar, and male and female snap fastener members extending outwardly from the handle bar surfaces whereby two of the magnetic tape security housings mate together in frictional engagement and an interlocking relationship to form a magnetic tape security package.

One significant aspect and feature of the present invention is a magnetic tape security housing which only includes one part; or the part positions with respect to itself, the two of the parts physically and integrally mate and interlock together to form a magnetic tape security package. All that is required by an individual is to use finger pressure against the palm of the hand for mating the two identical parts together where the hooks are retained by the latch, resulting in digitory feedback as the hooks engage the latches, causing and confirming secure interlocking engagement between the two housings.

Another significant aspect and feature of the present invention is a magnetic tape security package formed by two magnetic tape security housings which are so well integrally locked together through frictional interengagement is that the only way of disassembling the package is by literally destroying the ends or sides, and pulling the package physically apart. This is particularly useful in stopping shoplifters or thieves from opening a cardboard box and lifting out the contents. Even if the package is manhandled and contorted or twisted, removal of the contents would be further hampered by a security bar of finite width running across the front and back of the package between opposite sides of the inner perimeter of the opposing channels and surfaces. The package itself, with the carrying handle, is so big that it cannot be easily slipped into, or within, a pocket or a purse, or into one's shirt.

A further significant aspect and feature of the present invention is two magnetic tape security housings forming a magnetic tape security package which is low cost in the number of pennies per housing, providing for a package which is economically feasible to the manufacturer of the magnetic storage media. The teachings of the present invention can be applied to any type of a box and is not limited to only magnetic tapes, but can be utilized in other industries, such as the jewelry industry, the electronics industry, the housewares industry, and by other industries or lines of goods.

Having thus described one embodiment of the present invention, it is the principal object hereof to provide a magnetic tape security package, where two engaged magnetic tape security housings will form an integral magnetic tape security package.

One object of the present invention is to provide a magnetic tape security housing which when frictionally engaged and interlocked together will form a magnetic tape security package which cannot be opened or otherwise entered except by destroying, such as cutting with scissors, pliers, or the like, one end of the magnetic tape security housing to open the package.

Another object of the present invention is to provide a magnetic tape security housings utilizing digitory feedback, which is easily utilized by individuals for packaging the product which requires no tools in use whatsoever.

A further object of the present invention is to provide a magnetic tape security housing which is only one integral component, and by mating two of the component housings together in an opposing mirror image relationship, the interlocking relationship forms a magnetic tape security package.

Yet another object of the present invention is to provide a magnetic tape security housing which utilizes a combination reinforced carrying handle and multi-mode hanging feature, suitable for display on a single or dual rod display hanger.

BRIEF DESCRIPTION OF THE DRAWINGS

FIG. 5 illustrates a side view including partial cutaways of FIG. 4, and;

FIG. 6 illustrates an end view in cross-section of FIG. 4.

DESCRIPTION OF THE PREFERRED EMBODIMENTS

Figure 1:
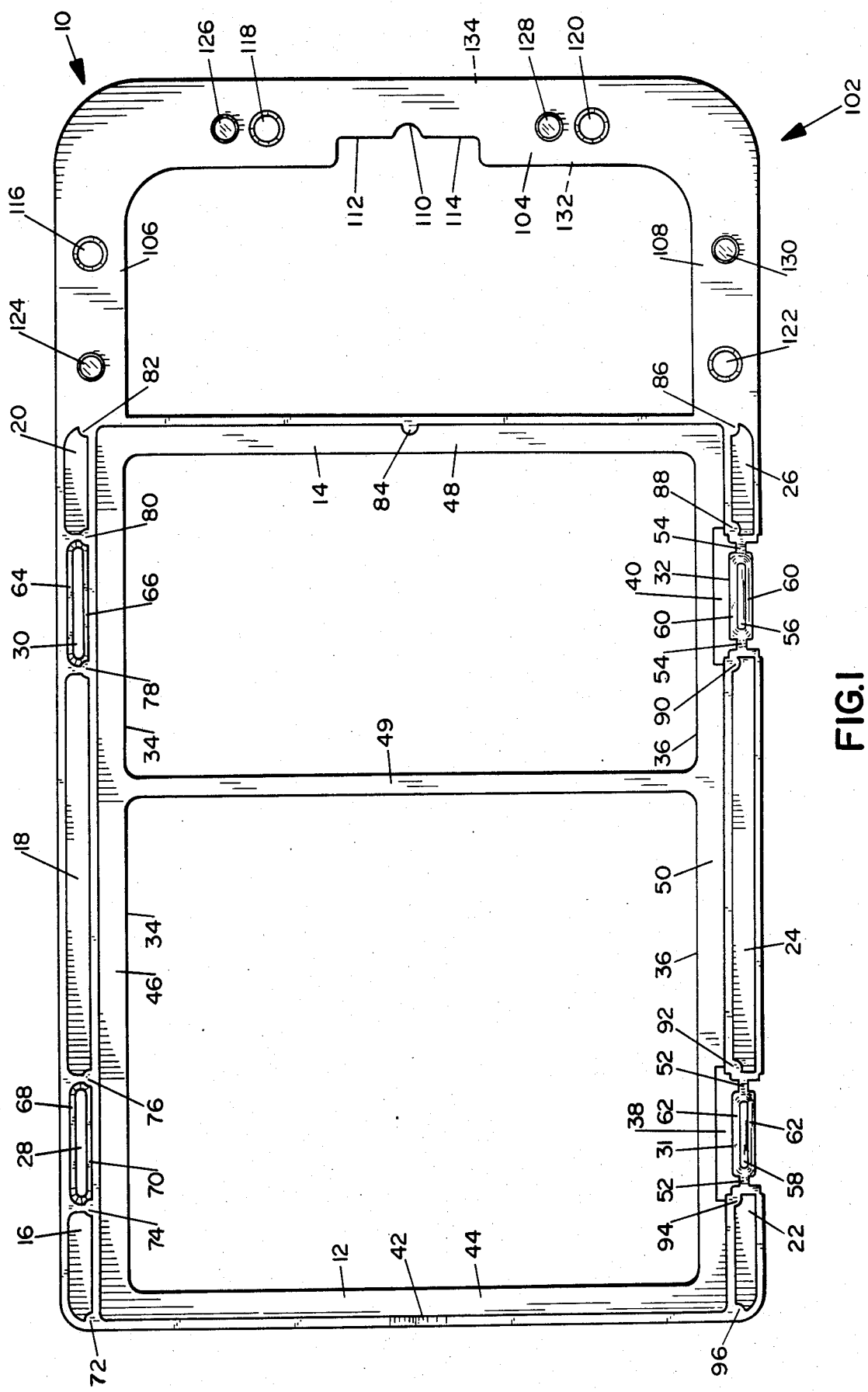
FIG. 1 illustrates a bottom view of a magnetic tape security housing.

FIG. 1 illustrates a bottom view of a magnetic tape security housing 10, including opposing left and right channel members 12 and 14, left, mid, and right, upper, and lower U-shaped channel members 16, 18, 20, 22, 24, and 26, respectively. Latches 28 and 30 position in between the U-shaped channels 16 and 18 and 18 and 20. Hooks 31 and 32 position in the lower U-shaped channel members. Opposing inner extending channel edges 34 and 36 extend inwardly from the U-shaped channel members and connect to the opposing left and right channel members 12 and 14 at the tops and bottoms of each left and right channel member 12 and 14. Indentations 38 and 40 position in the surface 50 for operation of the hooks 31 and 32. An opening port 42 positions in the left channel member 12. Surfaces 44, 46, 48, and 50 serve as strengthening members providing for vertical, as well as lateral support of the U-shaped members 16–26, as well as the right angle channel members 12 and 14. Lateral security bar 49 of a finite width joins surfaces 46 and 50. The hooks 31 and 32 include an arrow geometrical configuration and mount on vertical hook supports 52 and 54. The hooks 32 and 31 include a tip 56 and 58 and a flanged surface 60 and 62, respectively, for each of the hooks. Likewise, the latches include opposing ramped surfaces 64 and 66, and 68 and 70, respectively. Vertical supporting rods 72–96 position at the corners providing for reinforcement of vertical, as well as horizontal, integrity of the housing 10. U-shaped handle 102 is essentially planner in form, including a hanging bar 104, upper hanging bar support 106, lower hanging bar 108, semi-circular hanging cavity 110, hanging surfaces 112 and 114, ramped holes 116–122, and snap fasteners 124–130 which engage within and into ramped holes 116–122 in a locking relationship, and small inner and larger outer handle reinforcement members 132 and 134, as shown in FIG. 2, which travel fully around the inner and outer handle perimeters providing for rigidity of the handle 102.

Figure 2:
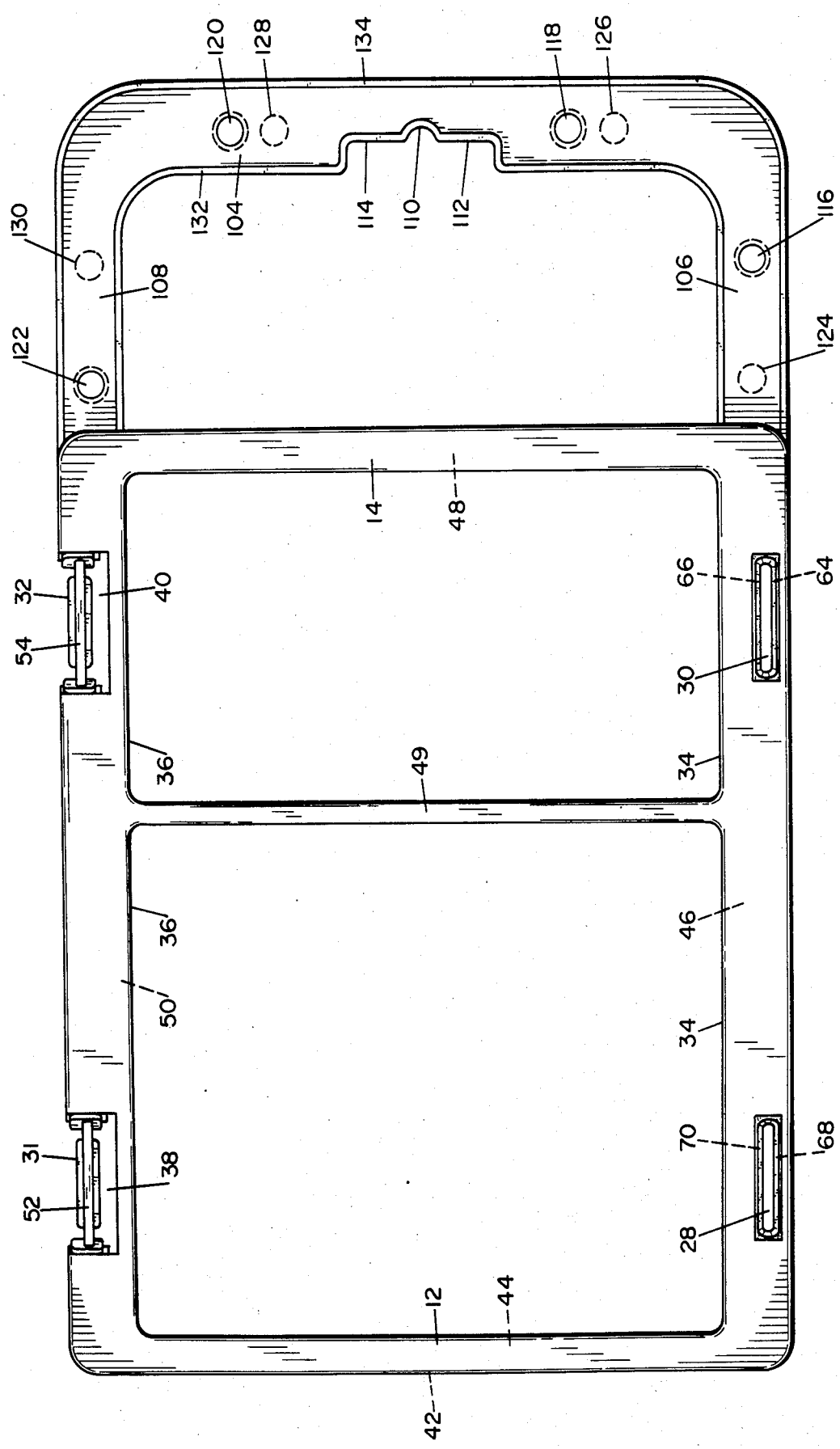
FIG. 2 illustrates a top view.

FIG. 2 illustrates a top view of FIG. 1 where all numerals correspond to those elements previously described. The figure illustrates a relatively flat planner top surface protruding above the planner surface providing for a smooth geometrical configuration of the housing 10.

Figure 3:
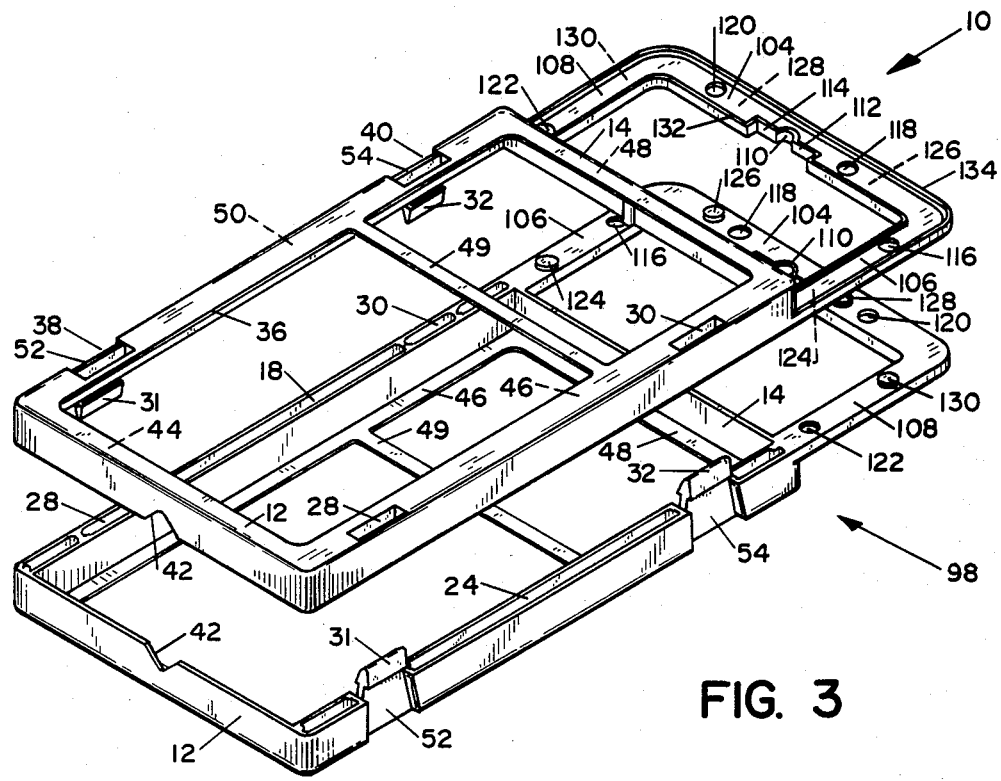
FIG. 3 illustrates a perspective view of two magnetic tape security housings in a mirror image relationship prior to interlocking engagement for forming a magnetic tape security package.

FIG. 3 illustrates a perspective view of the housing 10 including a bottom housing view, as well as a top housing view, prior to being frictionally and integrally engaged and interlocked together. The second magnetic tape security housing 98 is the exact component of the magnetic tape security housing 10 rotated by 180 degrees in a mirror image fashion providing for interlocking engagement between the same two identical component housings for subsequently forming the magnetic tape security package 100.

MODE OF OPERATION

Figure 4:
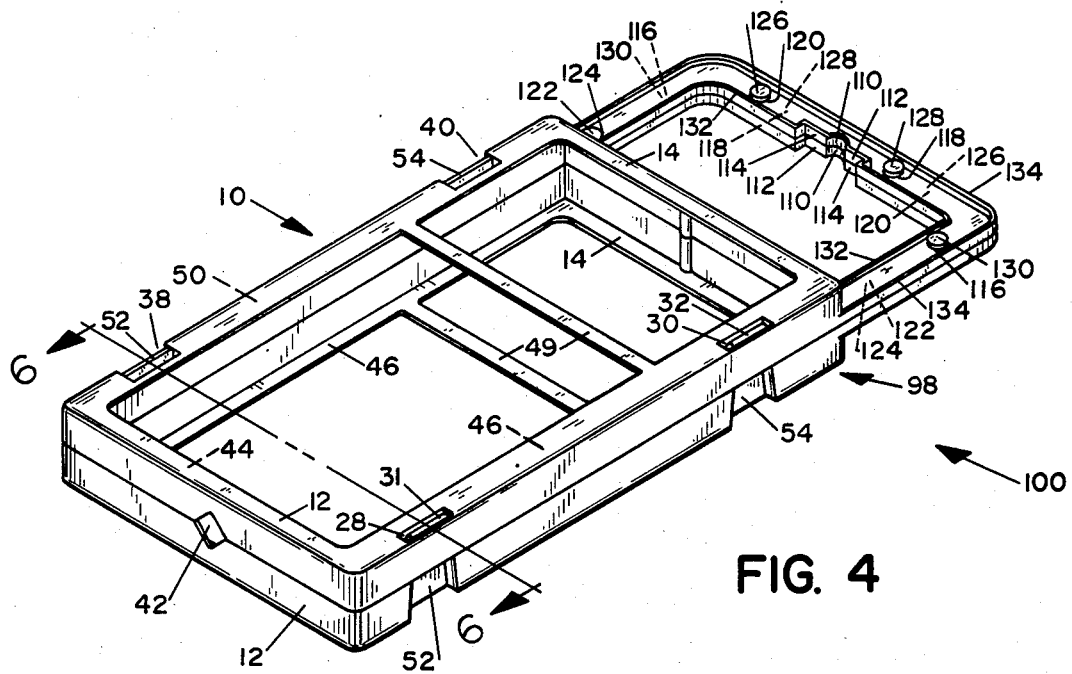
FIG. 4 illustrates the housings of FIG. 3 engaged and interlocked forming the magnetic tape security package.

FIG. 4 illustrates two magnetic tape security housings 10 and 98 interlocked in frictional and mechanical integral engagement with respect to each other, forming a magnetic tape security package 100. Hooks 31 and 32 of housing 10 engage in a snapping action within ramped surfaces 68 and 70 of latch 28 and ramped surfaces 64 and 66 of latch 30 of housing 98, respectively. In a like mirrored fashion, and with only moderate pressure applied, as by the fingers and palm of the human hands, hooks 31 and 32 of housing 98 engage latches 28 and 30 of housing 10 within the respective ramped surfaces 68 and 70 and 64 and 66. Once the hooks are secured in place within their respective latches, neither can be disengaged from the other, short of extreme brute force, or other inordinate ways, and the only way to open the package is by way of cutting as with a scissors or other simple mechanical device. The U-shaped carrying display handle 102 fastens together using snap fasteners and ramped holes. The snap fasteners 124, 126, 128, and 130 of hanging bar 104 and hanging bar supports 106 and 108, all of housing 10, engage into a snapping action into and through ramped holes 116, 118, 120, 122 of hanging bar 104 and hanging bar supports 106 and 108 of housing 98 for secure mechanical interlocking engagement. In a like and mirrored image fashion, the snap fasteners 124, 126, 128 and 130 of hanging bar 104 and hanging bar supports 106 and 108 of housing 98 engage, in a snapping action, within and through ramped holes 116, 118, 120 and 122 of hanging bar 104 and hanging bar supports 106 and 108, of housing 10 for like engagement. The joining of the handle assemblies together through the snap fasteners and ramped holes acts to strengthen the handle unit area along with inner handle reinforcement ridge 132 and outer handle reinforcement ridge 134 of both housings 10 and 98. The handle members for each housing can only be pulled apart under extreme pressure. All other numerals correspond to those elements previously described with respect to the elements of the magnetic tape security package 100.

FIG. 5 illustrates a side view of FIG. 4, including a partially cut away portion about the hook 32, latch 54, and handle 102. Particularly illustrated is the engagement of snap fasteners 124 and 130 in ramped holes 122 and 116, respectively, which is illustrative about like portions of the handle 102. All other numerals correspond to those elements previously described.

FIG. 6 illustrates a view taken along lines 6—6 of FIG. 4 where all numerals correspond to those elements previously described. Access port 42 is illustrated accordingly.

In an alternative embodiment of FIGS. 3-6, only one of the housings can be provided with a handle, while the other mated housing would not include a handle. For example, in FIG. 5, the handle and related structure to the right of the "x" would be eliminated, where just a rectangular housing would be moulded without the molded attached handle. Further, the remaining molded handle would therefore not require the snap fasteners or the ramped holes, but reinforcement ridges with a larger cross-section can be provided on not only the outer surface of the handle but also on the inner surface of the handle as desired.

I claim:

1. Magnetic tape security package including substantially identical housing members, each separate housing member comprising:
   a. spaced opposing horizontal channels;
   b. spaced opposing upper and lower U-shaped members connected to ends of said channels;
   c. hook for hooking connected to each end of one of said upper and lower U-shaped members and including open area indentations about an internal side of each of said hook means providing for latching movement of said hook means and a U-shaped mid-portion member connected between said hook means;
   d. latch means for latching connected to each end of an other of said upper and lower U-shaped members, opposing said hook means, and a U-shaped mid-portion member connected between said latch means;
   e. planar security bar connecting between said U-shaped mid-portion members; and,
   f. U-shaped carrying handle attached to end of one of said channels, a hanging-carrying bar surface in said handle, and a plurality of male and female snap fastener means for snap fastening extending outwardly from an inner surface of said handle whereby said channels, said U-shaped members, said planar security bar and said handle form a flat planar surface and two of said housing members mate together in interlocking engagement thereby forming said magnetic tape security package.

* * * * *